United States Patent
Ho et al.

(10) Patent No.: US 10,019,548 B2
(45) Date of Patent: *Jul. 10, 2018

(54) METHOD OF GENERATING MODIFIED LAYOUT AND SYSTEM THEREFOR

(71) Applicant: TAIWAN SEMICONDUCTOR MANUFACTURING COMPANY, LTD., Hsinchu (TW)

(72) Inventors: Chia-Ming Ho, Hsinchu (TW); Ke-Ying Su, Taipei (TW); Hsien-Hsin Sean Lee, Duluth, GA (US)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/651,616

(22) Filed: Jul. 17, 2017

(65) Prior Publication Data

US 2017/0316142 A1  Nov. 2, 2017

Related U.S. Application Data

(63) Continuation of application No. 14/452,078, filed on Aug. 5, 2014, now Pat. No. 9,710,588.

(51) Int. Cl.
*G06F 17/50* (2006.01)
*G03F 1/00* (2012.01)
(Continued)

(52) U.S. Cl.
CPC ............ *G06F 17/5072* (2013.01); *G03F 1/70* (2013.01); *G06F 17/5081* (2013.01); *G06F 2217/12* (2013.01); *G21K 5/00* (2013.01)

(58) Field of Classification Search
CPC ............ G06F 17/5072; G06F 17/5081; G06F 2217/12; G03F 1/00; G21K 5/00
(Continued)

(56) References Cited

U.S. PATENT DOCUMENTS 6,194,252 B1    2/2001  Yamaguchi
6,338,922 B1    1/2002  Liebmann et al.
(Continued)

FOREIGN PATENT DOCUMENTS

JP    2001-228599    8/2001
JP    2008-122948    5/2008
(Continued)

OTHER PUBLICATIONS

Office Action dated Jan. 13, 2016 and English translation from corresponding application No. KR 10-2014-0193457.
(Continued)

*Primary Examiner* — Phallaka Kik
(74) *Attorney, Agent, or Firm* — Hauptman Ham, LLP

(57) ABSTRACT

A method, of generating a modified layout based on an original layout, includes: determining a first set of width bias values of an i-th set of layout patterns which compensate for subtractive process effects, the original layout having N sets of layout patterns corresponding to N masks; determining a second set of width bias values of the i-th set of layout patterns of the original layout which compensate for additive process effects; generating the modified layout based on the first and second sets of width bias values of the i-th set of layout patterns, the order index i of the i-th mask corresponding to an order of the i-th mask being applied during a fabrication process; and fabricating, based on the modified layout, at least one of a semiconductor mask or at least one component in a layer of an inchoate semiconductor integrated circuit.

20 Claims, 12 Drawing Sheets

(51) Int. Cl.
*G21K 5/00* (2006.01)
*G03F 1/70* (2012.01)

(58) Field of Classification Search
USPC .......... 716/55, 51, 54, 118, 126; 703/15; 430/5; 378/35; 700/98, 120, 121
See application file for complete search history.

(56) References Cited

U.S. PATENT DOCUMENTS

| | | |
|---|---|---|
| 6,665,856 B1 | 12/2003 | Pierrat et al. |
| 6,974,650 B2 | 12/2005 | Lee et al. |
| 7,325,206 B2 | 1/2008 | White et al. |
| 8,056,020 B2 | 11/2011 | Yamada |
| 8,612,902 B1 | 12/2013 | Agarwal et al. |
| 8,887,106 B2 | 11/2014 | Ho et al. |
| 8,904,314 B1 | 12/2014 | Ho et al. |
| 2003/0054642 A1 | 3/2003 | Kagotani et al. |
| 2003/0211398 A1 | 11/2003 | Lee et al. |
| 2004/0096752 A1 | 5/2004 | Liebmann et al. |
| 2004/0165761 A1 | 8/2004 | Hung et al. |
| 2005/0076323 A1 | 4/2005 | Gau et al. |
| 2005/0132306 A1 | 6/2005 | Smith et al. |
| 2005/0172224 A1 | 8/2005 | Kobashi et al. |
| 2006/0019204 A1 | 1/2006 | Endo et al. |
| 2006/0271906 A1 | 11/2006 | Tang et al. |
| 2009/0024968 A1 | 1/2009 | Yamada |
| 2010/0167190 A1 | 7/2010 | Takahata et al. |
| 2011/0179393 A1 | 7/2011 | Xue et al. |
| 2011/0202892 A1 | 8/2011 | Lee et al. |
| 2012/0167021 A1 | 6/2012 | Chen et al. |

FOREIGN PATENT DOCUMENTS

| | | |
|---|---|---|
| KR | 10-2008-011440 | 12/2008 |
| KR | 10-2012-0071302 | 7/2012 |
| TW | 200832171 | 8/2008 |
| TW | I385549 | 2/2013 |
| TW | 201428820 | 7/2014 |

OTHER PUBLICATIONS

Office Action dated Feb. 17, 2017 from corresponding application No. TW 104117663.
Notice of Allowance dated Jul. 6, 2016 and English translation from corresponding application No. KR 10-2014-0193457.

| | $W_1$ | $W_2$ | $W_3$ | $W_4$ | $W_5$ |
|---|---|---|---|---|---|
| $S_1$ | $B_{11}$ | $B_{12}$ | $B_{13}$ | $B_{14}$ | $B_{15}$ |
| $S_2$ | $B_{21}$ | $B_{22}$ | $B_{23}$ | $B_{24}$ | $B_{25}$ |
| $S_3$ | $B_{31}$ | $B_{32}$ | $B_{33}$ | $B_{34}$ | $B_{35}$ |
| $S_4$ | $B_{41}$ | $B_{42}$ | $B_{43}$ | $B_{44}$ | $B_{45}$ |
| $S_5$ | $B_{51}$ | $B_{52}$ | $B_{53}$ | $B_{54}$ | $B_{55}$ |

METHOD OF GENERATING MODIFIED LAYOUT AND SYSTEM THEREFOR

PRIORITY CLAIM

The present application is a continuation of U.S. application Ser. No. 14/452,078, filed Aug. 5, 2014, which is incorporated herein by reference in its entirety.

RELATED APPLICATIONS

The instant application is related to U.S. patent application Ser. No. 14/030,672, filed Sep. 18, 2013, now U.S. Pat. No. 8,904,314, issued Dec. 2, 2014, the entire contents of the above-referenced application are incorporated by reference herein.

BACKGROUND

In semiconductor fabrication processes, a single layer of features is sometimes formed by using multiple-exposure or multiple-patterning technology to improve a spatial resolution of the particular layer. For example, if a layer of features are to be fabricated using N exposure or patterning processes (i.e., N-exposure or N-patterning), N being a positive integer greater than 1, layout patterns corresponding to a layout design for the layer of features are assigned to N different masks for corresponding exposure or patterning processes. Actual features fabricated based on the N masks using the multiple-patterning technology and the layout patterns differ in their physical characteristics of components, such as size, shape, position, or electrical properties. For example, if N is set as two (2), a first mask is used to form a first set of metal components and a second mask is used to form a second set of metal components. After formation of a first set of metal components according to the first mask, a spacer structure is formed to surround the first set of metal components. The second mask and the spacer structure are subsequently used to define the second set of metal components. Any variation during the formation of the first set of metal components and the spacer structure would in turn affect the physical characteristics of the second set of metal components.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1B is a diagram of N first type tables corresponding to a first set of layout patterns of the layout in FIG. 1A in accordance with some embodiments.

DETAILED DESCRIPTION

Figure 1A:
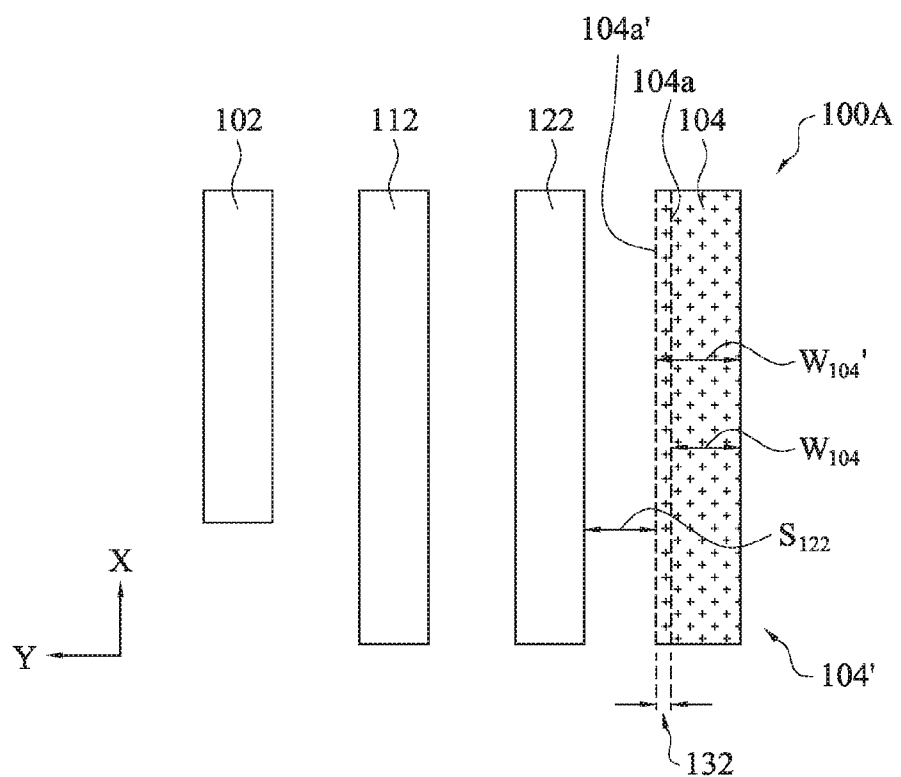
FIG. 1A is a top view of a portion of a layout illustrating an example application of tables in FIG. 1B in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 3:
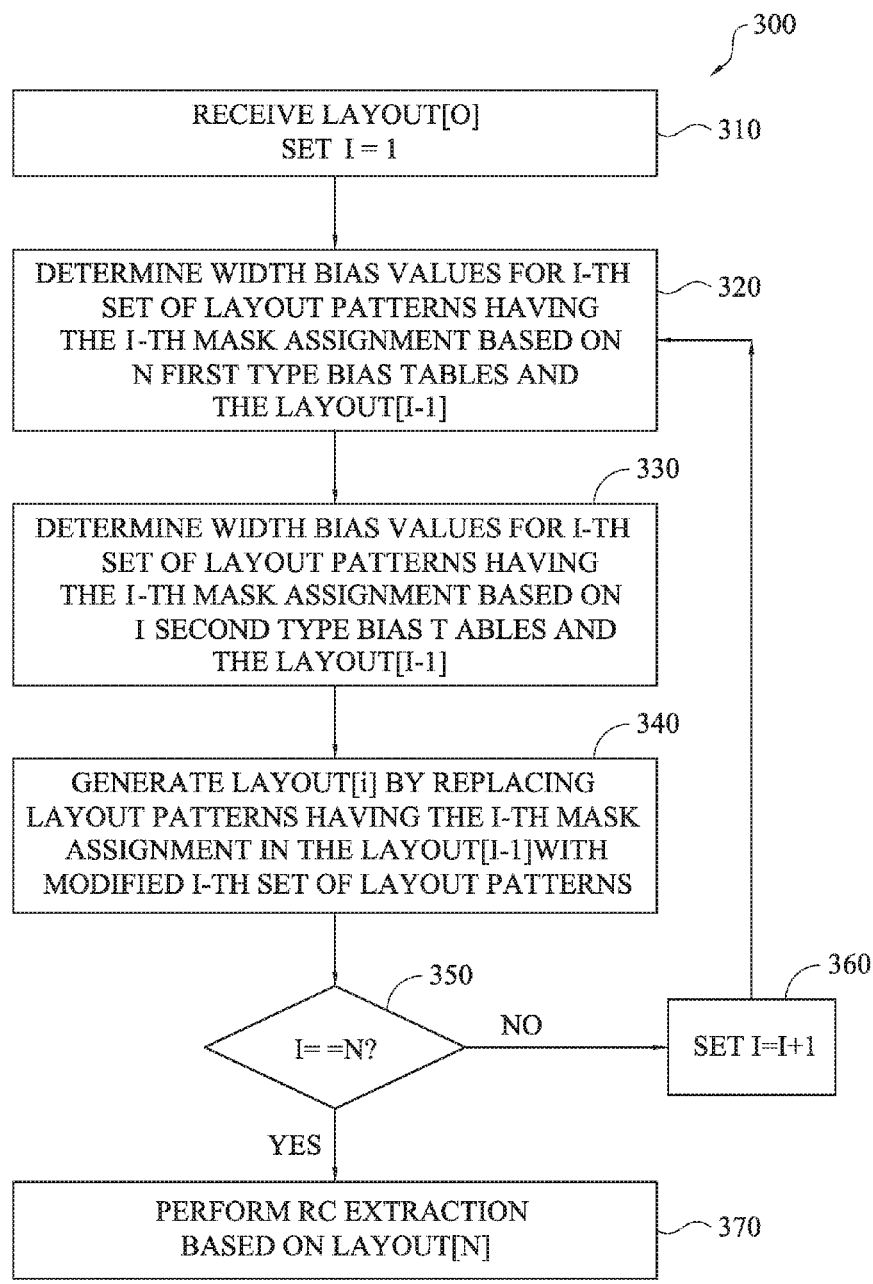
FIG. 3 is a flow chart of a method of modifying a layout, such as layouts in FIGS. 1A, 1C, 1D, and 2A according to tables in FIGS. 1B and 2B, and performing a resistance-capacitance extraction based on the modified layout in accordance with some embodiments.
Figure 4:
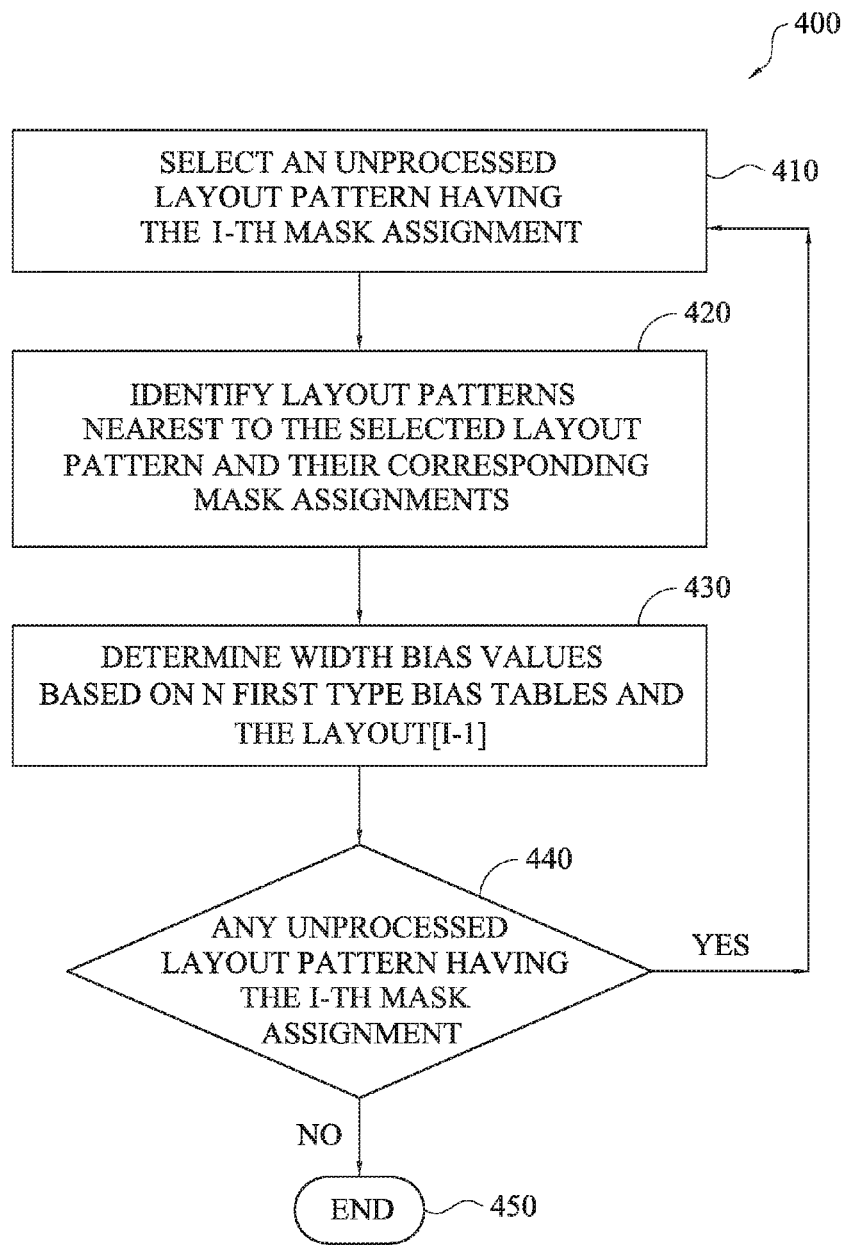
FIG. 4 is a flow chart of a method of determining width bias values based on the first type tables, which is usable to illustrate an operation block of the flow chart of FIG. 3 in accordance with some embodiments.
Figure 5:
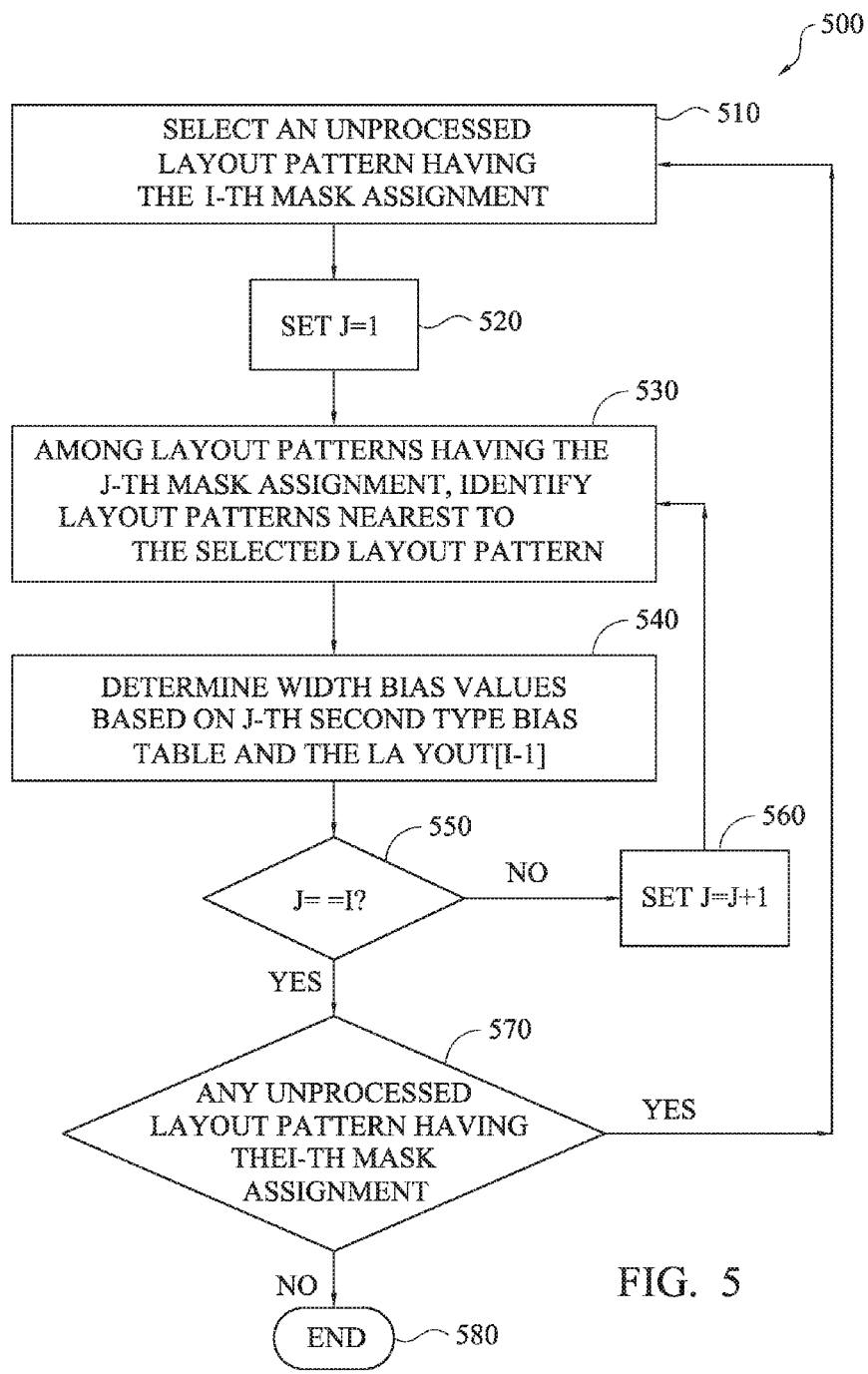
FIG. 5 is a flow chart of a method of determining width bias values based on the second type tables, which is usable to illustrate an operation block of the flow chart of FIG. 3 in accordance with some embodiments.

In some embodiments, the processes as disclosed in conjunction with FIGS. 3-5 are usable to generate a modified layout modeling the width variations caused by performing a multiple patterning process. As such, a subsequent resistance-capacitance extraction is performed based on the modified layout rather than the original layout, which models the physical characteristics of actual components fabricated using the multiple patterning process.

In some applications, a size of an actual component fabricated according to a layout pattern varies as interfered by other layout patterns. A difference between the size of the actual component and the corresponding layout pattern is recorded in the form of one or more width bias values. In the following examples, a victim component refers to a selected layout pattern to be processed to determine a corresponding width bias value, and an aggressor component refers to a layout that causes the victim layout pattern to have the width bias value. In some embodiments, the aggressor component, other components, and process variations collectively cause the victim component to have the width variation, and the aggressor component is usable as a representative for determining the width bias value usable to model the width variation.

FIG. 1A is a top view of a portion of a layout 100A usable for illustrating an example application of tables in FIG. 1B in accordance with some embodiments. Layout 100A includes layout patterns 102, 104, 112, and 122 extending along a first direction X. In this embodiment, layout patterns are being assigned to three different masks, where layout patterns 102 and 104 have a first mask assignment, layout pattern 112 has a second mask assignment, and layout pattern 122 has a third mask assignment. In some embodiments, there are more or less than three mask assignments. In some embodiments, the first, second, and third mask assignments correspond to a first, second and third mask applied sequentially as ordered during a fabrication process.

A first type of width variation is for modeling a nearest component bias effect. In some embodiments, the nearest component bias effect causes variations to physical characteristics of actual features after all components corresponding to all masks have been fabricated. In some embodiments, the nearest component bias effect is attributable to variations caused by a localized etching effect or a planarization process, such as a chemical-mechanical planarization (CMP) process. The first type of width variation of a victim component is a function of a nearest component, as the aggressor component, along a second direction Y perpendicular to direction X, a width of the victim component, and a distance between the victim component and the aggressor component along the second direction Y. The victim component refers to a selected layout pattern to be processed in accordance with the present disclosure, such as layout pattern 104. The aggressor component refers to a set of nearest layout patterns representing the causes of the width variation of the victim component. In this embodiment, layout pattern 122 is identified as the aggressor component for causing the first type of width variation of layout pattern 104, which is the victim component in this example. FIG. 1A is usable to explain the first type width variation caused by layout pattern 112 to a left side (corresponding to the positive Y direction) of layout pattern 104. The same rationale is applicable to determine the first type width variation caused by layout patterns to a right side (corresponding to the negative Y direction) of layout pattern 104, or the first type width variations to an upper side (corresponding to the positive X direction) or a lower side (corresponding to the negative X direction) of layout pattern 104.

FIG. 1B is a diagram of N first type tables 130[1], 120[2], and 130[N] corresponding to a first set of layout patterns, such as layout patterns having the first mask assignments, of the layout 100A in accordance with some embodiments. Various width bias values B11-B55 corresponding to a layout pattern having the first mask assignment are arranged in table 130[1] and indexed according to the distance S1, S2, S3, S4, and S5 between the victim component and the aggressor component, and the width W1, W2, W3, W4, and W5 of the victim component. In some embodiments, there are more or less than five difference distances in table 130[1], and there are more or less than five widths of the victim component in table 130[1]. In some embodiments, table 130[1] records width bias values B11-B55 corresponds to width variations caused by aggressor components positioned to the left of the victim component. In some embodiments, width bias values B11-B55 in table 130[1] are also applicable to width variations caused by aggressor components positioned to the right of the victim component. In some embodiments, width bias values B11-B55 in table 130[1] are also applicable to width variations caused by aggressor components positioned to the top or bottom of the victim component. In some embodiments, width variations caused by aggressor components positioned to the top or bottom of the victim component are recorded in another table, instead of using table 130[1].

In some embodiments, table 130[2] to table 130[N] have a similar formation as that of table 130[1]. Table 130[1] is applicable if the aggressor component has the first mask assignment, table 130[2] is applicable if the aggressor component has the second mask assignment, and table 130[N] is applicable if the aggressor component has the N-th mask assignment, etc.

In some embodiments, tables 130[1] to 130[N] are compiled according to one or more test-key semiconductor wafers according to a predetermined multiple patterning process. Test-key semiconductor wafers refer to wafers that are fabricated for obtaining various physical and electrical characteristics and performance associated with a particular fabrication process node. In some embodiments, tables 130[1] to 130[N] are compiled based on a measurement of previously fabricated semiconductor wafers according to the predetermined multiple patterning process.

For example, layout pattern 104 in FIG. 1A is selected as the victim component, and tables 130[1] to 130[N] in FIG. 1B are applicable to identify a proper width bias value caused by a victim component to the left or right of layout pattern 104. As depicted in FIG. 1A, layout pattern 122 is a nearest layout pattern to the left side of layout pattern 104. Here, because layout pattern has a third mask assignment, a width bias value, such as width bias value 132, is determined according to table 130[3] (e.g., 130[N] and N=3) based on corresponding width $W_{104}$ of layout pattern 104 and a distance $S_{122}$ between layout pattern 122 and layout pattern 104. The obtained width bias value 132 indicates that a side 104a of layout pattern 104 will be shifted to the left by the width bias value 132 to become side 104a'. The layout pattern 104 is thus modified (and also identified as 104') to have a width $W_{104}'$ according to a first type of variations based on a set of first type width bias tables.

In some embodiments, tables 130[1]-130[N] include combinations of possible widths and distances, and thus a bias value is obtainable by identifying the corresponding item in tables 130[1]-130[N]. In some embodiments, a bias value is obtainable by interpolation or extrapolation based on corresponding items in tables 130[1]-130[N]. In some embodiments, tables 130[1] to 130[N] are replaced by other means, including, for example, one or more mathematical equations or curves representing the corresponding width bias values based on a distance S1, S2, S3, S4, or S5 and a width W1, W2, W3, W4, or W5 defined above.

Figure 1C:
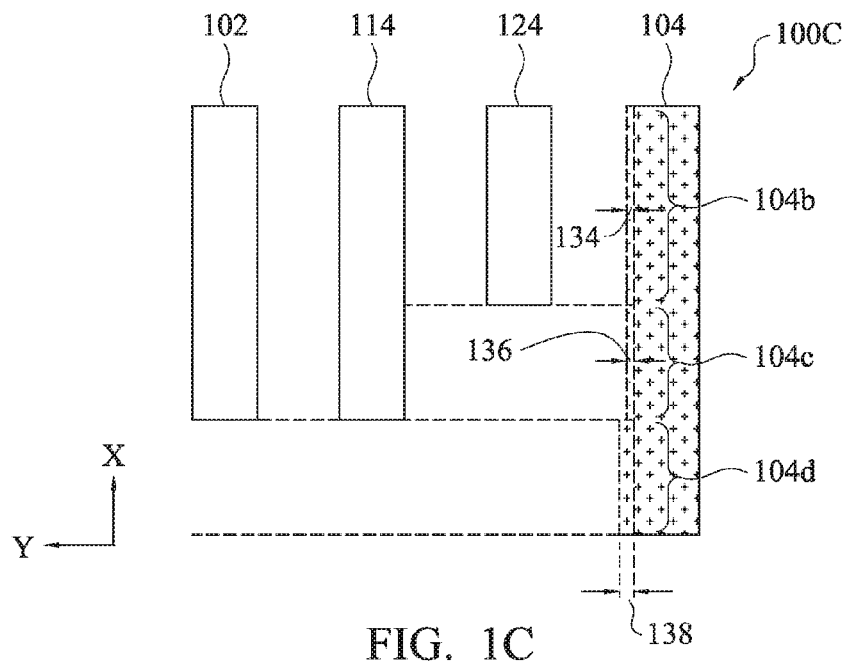
FIG. 1C is a top view of a portion of another layout illustrating another example application of tables in FIG. 1B in accordance with some embodiments.

FIG. 1C is a top view of a portion of another layout 100C usable for illustrating another example application of tables in FIG. 1B in accordance with some embodiments. Components in FIG. 1C that are the same or similar to those in FIG. 1A are given the same reference numbers. Layout 100C includes layout patterns 102, 104, 114, and 124. In this embodiment, layout patterns are being assigned to three different masks, where layout patterns 102 and 104 have a first mask assignment, layout pattern 114 has a second mask assignment, and layout pattern 124 has a third mask assignment.

A side 104a (FIG. 1A) of layout pattern 104 is divided into three segments: segment 104b, segment 104c, and segment 104d. Left side 104a of layout pattern 104 is checked and modified in a segment-by-segment basis. Layout pattern 124 is a nearest layout pattern to the segment 104b of the left side of layout pattern 104 as projected along the direction Y and has a third mask assignment, a width bias value 134 is determined according to table 130[3] that corresponds to the third mask. Layout pattern 114 is a nearest layout pattern to the segment 104c of the left side of layout pattern 104 as projected along the direction Y and has a second mask assignment, a width bias value 136 is determined according to table 130[2] that corresponds to the second mask. No layout pattern constitutes a nearest layout pattern to the segment 104d of the left side of layout pattern 104. In some embodiments, tables 130[1]-130[N] include a row of indexed bias values, such as the row of values $B_{51}$-$B_{55}$ corresponding to distance S5 in table 130[1] that is applicable for a distance equal to or greater than a threshold distance S5, and a width bias value 138 is determined according to the row indexed by the threshold distance S5. Width bias value 138 corresponds to a width variation as a result of no aggressor component within a distance of the predetermined threshold value.

FIG. 1C is usable to explain the width variation caused by layout patterns to a left side (i.e., positive Y direction) of layout pattern 104, and is for illustration. The same rationale is applicable to determine the width variation caused by layout patterns to a right side (i.e., negative Y direction) of layout pattern 104.

Figure 1D:
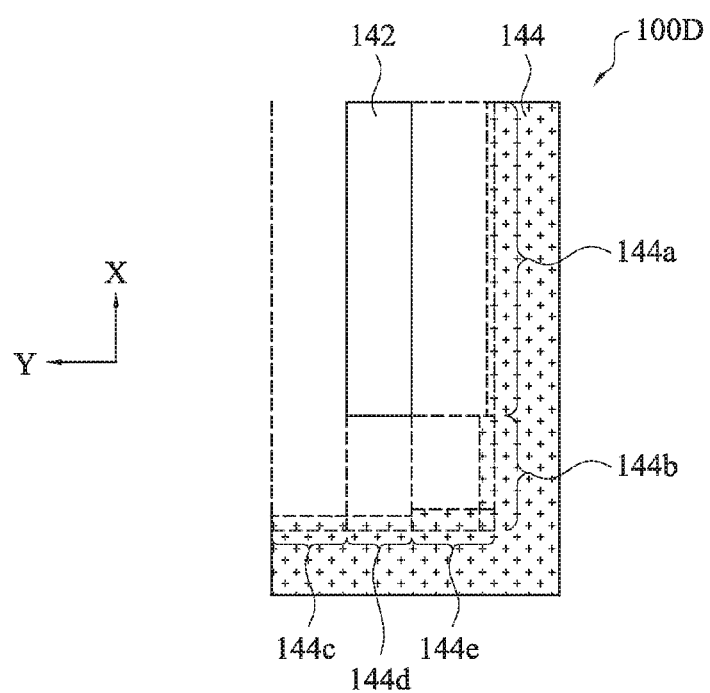
FIG. 1D is a top view of a portion of yet another layout illustrating another example application of tables in FIG. 1B in accordance with some embodiments.

FIG. 1D is a top view of a portion of yet another layout 100D usable for illustrating another example application of tables in FIG. 1B in accordance with some embodiments. Layout 100D has a first layout pattern 142 and a second layout pattern 144. Layout pattern 142 has a second mask assignment, and layout pattern 144 has an L-shape and has a first mask assignment. Layout pattern 144 has a leg corresponding to side segments 144a and 144b extending along the X direction and a leg corresponding to side segments 144c, 144d, and 144e extending along the Y direction. Layout pattern 144 extends long the Y direction. In this embodiment, various width bias values corresponding to segments 144a and 144b are determined according to nearest components found along the Y direction, and various width bias values corresponding to segments 144c, 144d, and 144e are determined according to nearest components found along the X direction according to the rational illustrated in conjunction with FIGS. 1A-1C.

FIG. 1D is usable to explain the width variation caused by layout patterns to a left side and an upper side of layout pattern 104, and is for illustration. The same rationale is applicable to determine the width variation caused by layout patterns to a right side and a lower side of layout pattern 104.

Figure 2A:
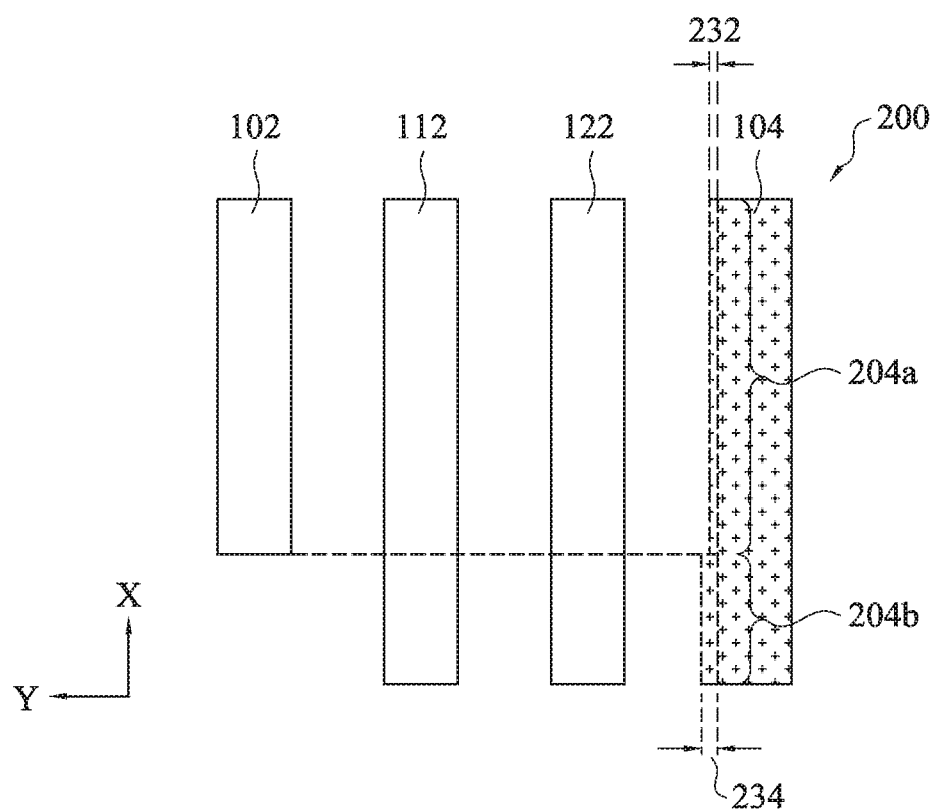
FIG. 2A is a top view of a portion of a layout illustrating an example application of tables in FIG. 2B in accordance with some embodiments.
Figure 2B:
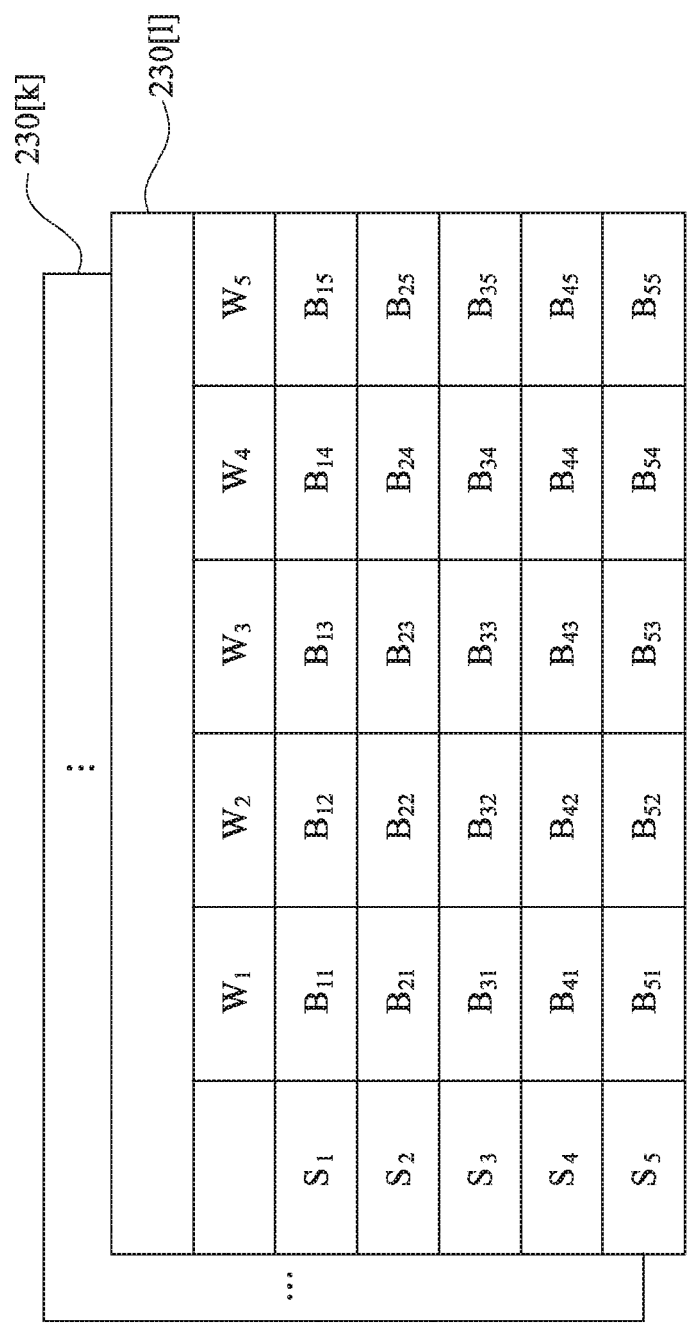
FIG. 2B is a diagram of one or more second type tables corresponding to a first set of layout patterns of the layout in FIG. 2A in accordance with some embodiments.

FIG. 2A is a top view of a portion of a layout 200 usable for illustrating an example application of tables in FIG. 2B in accordance with some embodiments. Components in FIG. 2A that are the same or similar to those in FIG. 1A are given the same reference numbers.

A second type of width variation is for modeling a second order component bias effect. In some embodiments, the second order component bias effect is caused by components fabricated before or at the same time as a victim layout pattern. For example, for a k-th set of layout patterns having k-th mask assignment, the second order component bias effect is attributable to variations caused by a lithographic process and a spacer process corresponding to layout patterns having the first to the (k−1)-th mask assignments. The second type of width variation is a function of a nearest component of each set of layout patterns corresponding to each of the first (k−1) mask assignments (also referred to as an aggressor component), a width of the victim component, and a distance between the victim component and the aggressor component. The victim component refers to a selected layout pattern to be processed in accordance with the present disclosure, such as layout pattern 104. The aggressor component refers to a set of nearest layout patterns having the same (i.e., the k-th mask assignment) or the first (k−1) mask assignments, such as layout patterns having the first, second, . . . , the k-th mask assignments.

For example, layout patterns 102 and 104 have a first mask assignment, layout pattern 112 has a second mask assignment, and layout pattern 122 has a third mask assignment. Second type of width variation of layout pattern 102 or 104 is attributable to layout patterns having the first mask assignment. Second type of width variation of layout pattern 112 is attributable to layout patterns having the first mask assignment and layout patterns having the second mask assignment. Also, second type of width variation of layout pattern 122 is attributable to layout patterns having the first mask assignment, layout patterns having the second mask assignment, and layout patterns having the third mask assignment. For each combination of victim component and aggressor component, the corresponding width bias value attributable to such combination is determined in a manner similar to those illustrated in conjunction with FIGS. 1A-1D and will be further illustrated below in conjunction with FIGS. 2A-2B.

FIG. 2A is usable to explain the second type width variation caused by layout pattern 102 to a left side of layout pattern 104. The same rationale is applicable to determine the second type width variation caused by layout patterns to a right side of layout pattern 104 along an opposite direction of second direction Y.

FIG. 2B is a diagram of one or more second type tables 230[1] and 230[k] corresponding to a k-th set of layout patterns of the layout in FIG. 2A in accordance with some embodiments. Various width bias values B11-B55 corresponding to a layout pattern having the first mask assignment to a victim component corresponding to a layout pattern having the k-th mask assignment are arranged in table 230[1] and indexed according to the distance S1, S2, S3, S4, and S5 between the victim component and the aggressor component, and the width W1, W2, W3, W4, and W5 of the victim component. In some embodiments, there are more or less than five difference distances in table 230[1], and there are more or less than five widths of the victim component in table 230[1]. In some embodiments, table 230[k] has similar formation as table 230[1]. Table 230[1] is applicable if the aggressor component has the first mask assignment, and table 230[k] is applicable if the aggressor component has the same (k-th) mask assignment as the victim layout pattern.

In some embodiments, tables 230[1] to 230[k] are compiled according to one or more test-key semiconductor wafers according to a predetermined multiple patterning process. In some embodiments, tables 230[1] to 230[k] are compiled based on measurement of previously fabricated semiconductor wafers according to the predetermined multiple patterning process. In some embodiments, tables 230[1] to 230[N] are replaced by other means, including, for example, one or more mathematical equations or curves representing the corresponding width bias values based on a distance S1, S2, S3, S4, or S5 and a width W1, W2, W3, W4, or W5 defined above.

For example, layout pattern 104 in FIG. 2A is selected as the victim component to be processed for determining the corresponding width bias values. Left side 104a of layout pattern 104 is identifiable as a combination of two segments 204a and 204b and is checked and modified in a segment-by-segment basis. In FIG. 2A, layout pattern 102 is the nearest layout pattern to a segment 204a of the left side of layout pattern 104 as being projected along the Y direction that also has the first mask assignment. A width bias value 232 is determined according to table 230[1] based on corresponding width of layout pattern 104 and a distance between layout pattern 102 and layout pattern 104. No layout pattern constitutes a nearest layout pattern to a segment 204b of the left side of layout pattern 104 that has the first mask assignment. Width bias value 234 corresponds to a width variation as a result of no aggressor component within a distance of a predetermined threshold value. In some embodiments, width bias value 234 is determined according to table 230[1] corresponding to a distance equal to or greater than the predetermined threshold value. Therefore, left side 104a of layout pattern 104 is modified in a segment-by-segment basis according to width bias values 232 and 234.

FIG. 2A is usable to explain the width variation caused by layout patterns to a left side (i.e., positive Y direction) of layout pattern 104. The same rationale is applicable to determine the width variation caused by layout patterns to a right side (i.e., negative Y direction) of layout pattern 104.

FIG. 3 is a flow chart of a method 300 of modifying a layout, such as layouts in FIGS. 1A, 1C, 1D, and 2A according to tables in FIGS. 1B and 2B, and performing a resistance-capacitance extraction based on the modified layout in accordance with some embodiments. It is understood that additional operations may be performed before, during, and/or after the method 300 depicted in FIG. 3, and that some other processes may only be briefly described herein.

The process 300 begins with operation 310, where an original layout (labeled as LAYOUT[0]) is received. An order index i is set as 1. The order index i is used to explain the flow of various operations. In some embodiments, a sequence of various operations of method 300 has been hard-wired or fixed in a program, and the performance of method 300 thus does not require actually creating and/or setting a variable in a computer system corresponding to the order index i. In this embodiment, the original layout having N sets of layout patterns variously corresponding to N masks, where the i-th set of layout patterns having an i-th mask assignment corresponding to an i-th mask of the N masks. The order index i is an integer from 1 to N, and N is an integer and greater than 1.

For example, the first mask assignment associated with layout patterns 102 and 104 in FIG. 1A or 2A corresponds to the order index i=1; the second mask assignment associated with layout pattern 112 corresponds to the order index i=2; and the third mask assignment associated with layout pattern 122 corresponds to the order index i=3.

The process 300 then proceeds to operation 320, where a first set of width bias values of the i-th set of layout patterns is determined according to N first type width bias tables, such as the first type width bias tables illustrated in conjunction with FIGS. 1A-1D. Detailed operations of operation 320 will be further illustrated in conjunction with FIG. 4.

The process then proceeds to operation 330, where a second set of width bias values of the i-th set of layout patterns is determined according to i second type width bias tables, such as the second type width bias tables illustrated in conjunction with FIGS. 2A-2B. Detailed operations of operation 330 will be further illustrated in conjunction with FIG. 5.

The process 300 then proceeds to operation 340, where a layout LAYOUT[i] is generated by replacing the i-th set of layout patterns in layout LAYOUT[i−1] with the modified i-th set of layout patterns based on the width bias values determined during operation 320 and 330. In some embodiments, generating the layout LAYOUT[i] includes adjusting the left side of a selected layout pattern of the i-th set of layout patterns according to the width bias values determined in operations 320 and 330; and adjusting the right side of a selected layout pattern of the i-th set of layout patterns according to the width bias values determined in operations 320 and 330. In some embodiments, generating the layout LAYOUT[i] includes adjusting the upper side and/or lower side of a selected layout pattern according to the width bias values determined in operations 320 and 330.

The process 300 then proceeds to operation 350 to determine if order index i equals the number of masks N. If order index i does not equal the number of masks N, the process proceeds to operation 360, where order index i is increased by 1. If order index i equals the number of masks N, the process 300 proceeds to operation 370, where layout LAYOUT[N] is used as the modified layout, and a resistance-capacitance extraction is performed based on the modified layout. In some embodiments, various operations are set to be performed consistent with the sequence defined herein by means of, for example, a hard-wired controller or a state machine without using variables corresponding to the order index i and the number N.

In some embodiments, the original layout and the modified layout are accessible in a Graphic Database System (GDS) file format.

FIG. 4 is a flow chart of a method 400 of determining width bias values based on the first type tables, which is usable to illustrate operation 320 of the flow chart of FIG. 3, in accordance with some embodiments. In some embodiments, the first type width bias tables illustrated in conjunction with FIGS. 1A-1D are usable as the first type tables here. It is understood that additional operations may be performed before, during, and/or after the method 400 depicted in FIG. 4, and that some other processes may only be briefly described herein.

The process 400 begins with operation 410, where an unprocessed layout pattern of the i-th set of layout patterns having the i-th mask assignment is selected. For example, layout pattern 104 in FIG. 1A having the first mask assignment is selected. Then, in operation 420, a set of nearest layout patterns to the selected layout pattern and their corresponding mask assignments are identified. For example, layout pattern 122 in FIG. 1A or layout patterns 114 and 124 in FIG. 1C are identified as the nearest layout pattern(s) of layout pattern 104. The process 400 proceeds to operation 430, where corresponding width bias values are determined based on the N first type table, such as tables 130[1] to 130[N] in FIG. 1B, and the dimensions of various layout patterns in the layout LAYOUT[i−1].

Layout LAYOUT[i−1] includes the modified first (i−1) sets of layout patterns and original (N−i+1) sets of layout patterns. For example, after determining width bias values for layout patterns having a first mask assignment, the layout patterns having the first mask assignment are modified accordingly. However, at this point, the layout patterns having the second or third mask assignments have not been modified and are original layout patterns.

In some embodiments, operation 420 is performed with respect to the left side of victim components. For example, operation 420 includes identifying a first set of nearest layout patterns among the first (i−1) sets of modified layout patterns, or the original layout if the order index i is 1, and the last (N−i+1) sets of layout patterns to a left side of the selected layout pattern of the i-th set of layout patterns. Accordingly, operation 430 includes determining a first subset of width bias values applicable to the left side of the selected layout pattern based on the N first type bias tables of the i-th set of width bias tables. In some embodiments, operation 420 is further performed with respect to the right side of victim components. For example, operation 420 includes identifying a second set of nearest layout patterns in the first (i−1) modified layout patterns, or the original layout if the order index i is 1, and the last (N−i+1) sets of layout patterns to a right side of the selected layout pattern opposite the left side. Accordingly, operation 430 further includes determining a second subset of width bias values applicable to the right side of the selected layout pattern based on the N first type bias tables of the i-th set of width bias tables.

In some embodiments, operation 420 further includes identifying a third set of nearest layout patterns in the first (i−1) modified layout patterns, or the original layout if the order index i is 1, the last (N−i+1) sets of layout patterns to an upper and/or lower side of the selected layout pattern, and operation 430 further includes determining a third subset of width bias values applicable to the third side of the selected layout pattern based on the N first type bias tables of the i-th set of width bias tables.

The process proceeds to operation 440, where if there is any unprocessed layout pattern of the i-th set of layout patterns is determined. If there are one or more unprocessed layout patterns of the i-th set of layout patterns, the process proceeds to operation 410. Otherwise, after all layout patterns of the i-th set of layout patterns are processed based on the N first type width bias tables, the process ends at operation 450.

FIG. 5 is a flow chart of a method 500 of determining width bias values based on the second type tables, which is usable to illustrate operation 330 of the flow chart of FIG. 3, in accordance with some embodiments. In some embodiments, the second type width bias tables illustrated in conjunction with FIGS. 2A-2B are usable as the second type tables here. It is understood that additional operations may be performed before, during, and/or after the method 500 depicted in FIG. 5, and that some other processes may only be briefly described herein.

The process 500 begins with operation 510, where an unprocessed layout pattern of the i-th set of layout patterns having the i-th mask assignment is selected. For example, layout pattern 104 in FIG. 2A having the first mask assignment is selected. Then, in operation 520, another order index j is set to be 1. The order index j is an integer from 1 to i. For example, for layout pattern 104 having the first mask assignment, index j is set to 1 representing analyzing the second type width variation based on an aggressor component having the first mask assignment against the victim having first mask assignment. Later if j is set to 2, an aggressor component having the second mask assignment is analyzed.

Then, in operation 530, a set of nearest layout patterns to the selected layout pattern having the j-th mask assignment is identified. For example, layout pattern 102 in FIG. 2A and a "blank" as corresponding to segment 204b are identified as the nearest layout pattern(s) for the purposes of determining second type width variations of victim component 104. The process 500 proceeds to operation 540, where corresponding width bias values are determined based on the j-th second type table, such as table 230[1] in FIG. 2B for the aggressor components having the first mask assignment, and the dimensions of various layout patterns in the layout LAYOUT[i−1].

The process proceeds to operation 550 to determine if the order index equals the order index i. If the order index j does not equal the order index i, the order index is increased by 1 in operation 560, and the process 500 proceeds to operation 530.

In some embodiments, the combination of operations 530 and 550 includes identifying a first set of nearest layout patterns in each of the first (i−1) sets of modified layout patterns if the order index i is greater than 1 and the i-th set of layout patterns to the left side of the selected layout pattern, and the combination of operations 540 and 550 includes determining a first subset of width bias values applicable to the left side of the selected layout pattern based on the i second type bias tables of the i-th set of width bias tables. In some embodiments, the combination of operations 530 and 550 further includes identifying a second set of nearest layout patterns in each of the first (i−1) sets of modified layout patterns if the order index i is greater than 1, and the i-th set of layout patterns to the right side of the selected layout pattern, and the combination of operations 540 and 550 includes determining a second subset of width bias values applicable to the right side of the selected layout pattern based on the i second type bias tables of the i-th set of width bias tables.

In some embodiments, the combination of operations 530 and 550 includes identifying a third set of nearest layout patterns in each of the first (i−1) sets of modified layout patterns if the order index i is greater than 1, and the i-th set of layout patterns to an upper or lower side of the selected layout pattern, and the combination of operations 540 and 550 includes determining a third subset of width bias values applicable to the upper or lower side of the selected layout pattern based on the i second type bias tables of the i-th set of width bias tables.

In operation 550, if order index j equals the order index i, all masks patterns having the same or smaller order index have been considered, and the process proceeds to operation 570. For example, for a victim component having the second mask assignment, index j=1 represents the aggressor components having the first mask assignment have been considered; and index j=2 represents the aggressor components having the second mask assignment have been considered.

In operation 570, it is determined if there is any unprocessed layout pattern of the i-th set of layout patterns. If there are one or more unprocessed layout patterns of the i-th set of layout patterns, the process proceeds to operation 510. Otherwise, after all layout patterns of the i-th set of layout patterns are processed based on the i second type width bias tables, the process ends at operation 580.

The order index j is used to explain the flow of various operations. In some embodiments, various operations are set to be performed consistent with the sequence defined herein by means of, for example, a hard-wired controller or a state machine without using a variable corresponding to the order index j.

Figure 6A:
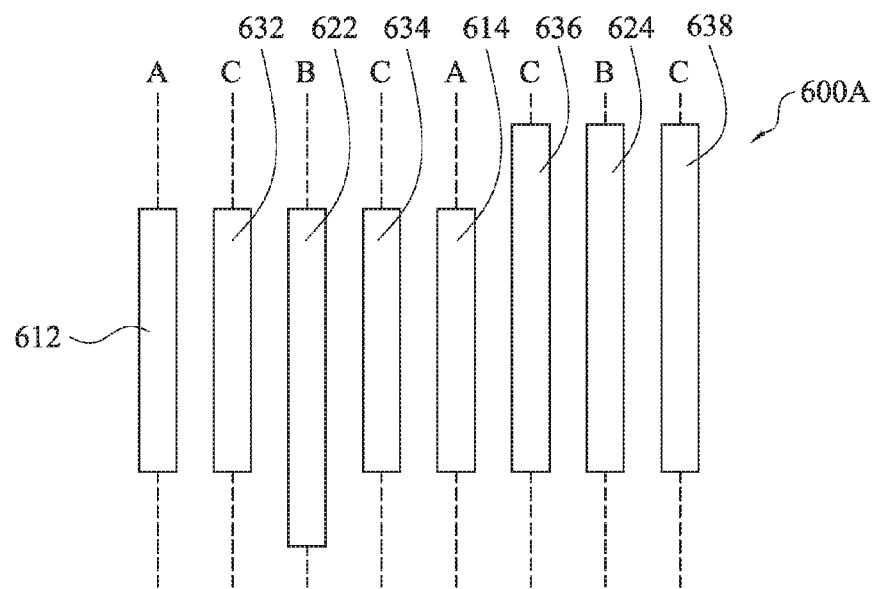
FIG. 6A is a top view of a portion of a layout before the operations in FIGS. 3-5 are performed in accordance with some embodiments.

FIG. 6A is a top view of a portion of a layout 600A before the operations in FIGS. 3-5 are performed in accordance with some embodiments. Layout 600A includes layout patterns 612 and 614 having a first mask assignment (i.e., mask A), layout patterns 622 and 624 having a second mask assignment (i.e., mask B), and layout patterns 632, 634, and 636 having a third mask assignment (i.e., mask C). In other words, as an example, N is set as three (3). In some embodiments, layout 600A corresponds to the original layout LAYOUT[0] in FIG. 3.

Figure 6B:
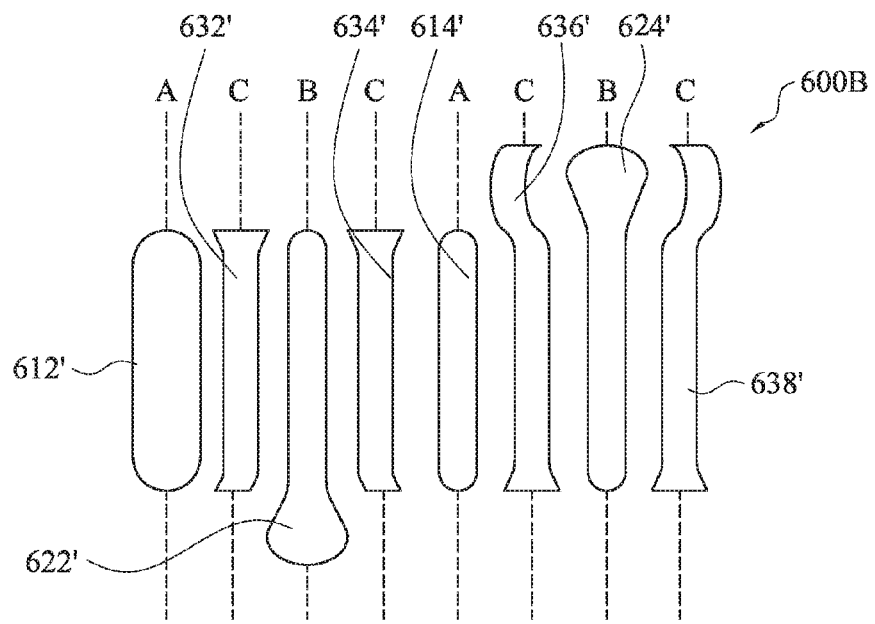
FIG. 6B is a top view of a portion of actual components fabricated according to the layout in FIG. 6A in accordance with some embodiments.

FIG. 6B is a top view of a portion of components 600B fabricated according to a layout, such as layout 600A, in accordance with some embodiments. The components 600B include components 612', 614', 622', 624', 632', 634', and 636' corresponding to layout patterns 612, 614, 622, 624, 632, 634, and 636. Because of the variations caused by either the first type variation illustrated in conjunction with FIGS. 1A-1D or the second type variation illustrated in conjunction with FIGS. 2A and 2B, the size and shape of components 612', 614', 622', 624', 632', 634', and 636' are different from the size and shape of their corresponding layout patterns 612, 614, 622, 624, 632, 634, and 636 in the original layout 600A. As such, the electrical characteristics, such as parasitic resistance and parasitic capacitance, of components 612', 614', 622', 624', 632', 634', and 636' are also different from the corresponding electrical characteristics extracted or derived based on the size and shape of layout patterns 612, 614, 622, 624, 632, 634, and 636 in the original layout 600A.

Figure 6C:
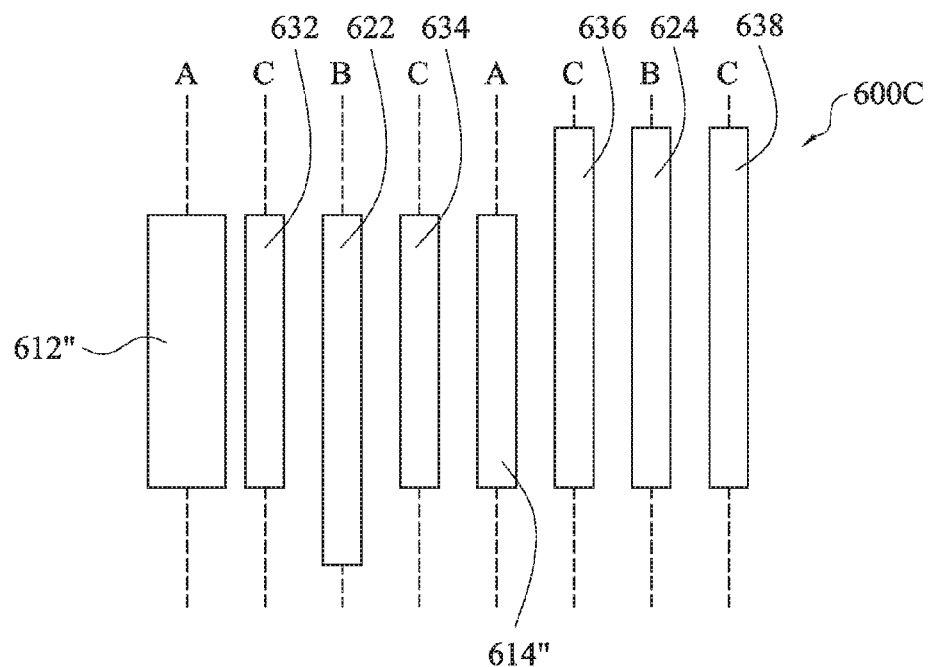
FIG. 6C is a top view of a portion of a first modified layout corresponding to LAYOUT[1] in FIG. 3 in accordance with some embodiments.

FIG. 6C is a top view of a portion of a first modified layout 600C corresponding to LAYOUT[1] in FIG. 3 in accordance with some embodiments. In some embodiments, operations 320 and 330 for determining first type width bias values and second type width bias values for the first (index i=1) set of layout patterns of the original layout 600A having the first mask assignment (i.e., mask A) is repetitively performed. For example, the first set of layout patterns 612 and 614 are victim components and processed to become modified first set of layout patterns 612" and 614". The nearest layout pattern 632 to the right of layout pattern 612 is the aggressor component of layout pattern 612 with regard to the first type width variation. The nearest layout patterns 634 and 636 of layout pattern 614 are the aggressor components of layout pattern 614 with regard to the first type width variation. Also, layout pattern 612 is the aggressor components of layout pattern 614 with regard to the second type width variation attributable to mask A (i.e., index j=1), and layout pattern 614 is the aggressor components of layout pattern 612 with regard to the second type width variation attributable to mask A. The first modified layout 600C is generated by modifying the first set of layout patterns 612 and 614 according to the original layout, three first type bias tables of the first set of width bias tables, and one second type bias tables of the first set of width bias tables.

Figure 6D:
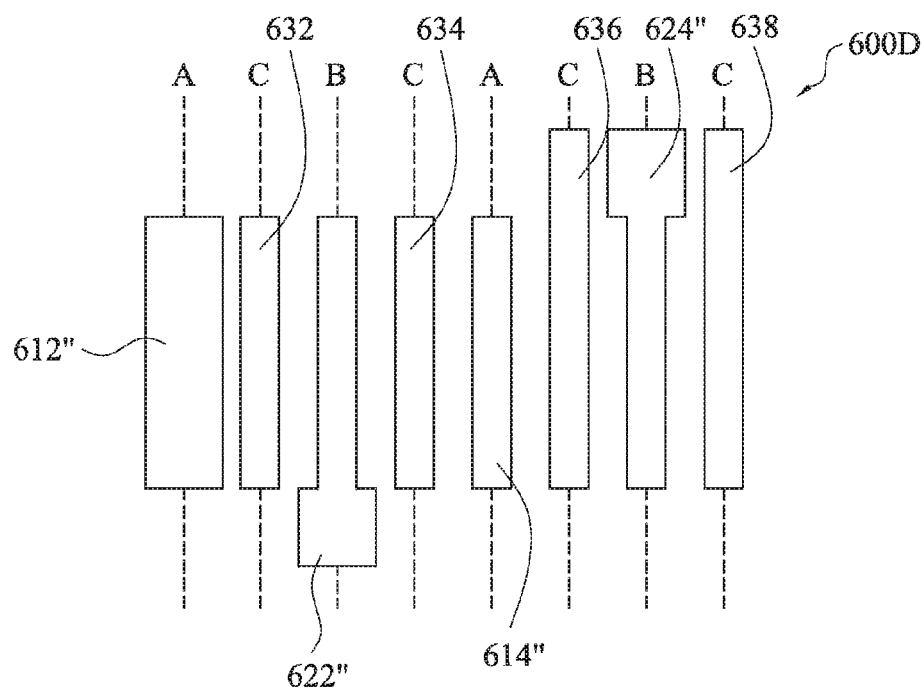
FIG. 6D is a top view of a portion of a second modified layout corresponding to LAYOUT[2] in FIG. 3 in accordance with some embodiments.

FIG. 6D is a top view of a portion of a second modified layout 600D corresponding to LAYOUT[2] in FIG. 3 in accordance with some embodiments. The second (index i=2) set of layout patterns 622 and 624 are processed to become modified second set of layout patterns 622" and 624". The nearest layout patterns 632 and 634 of layout pattern 622 are the aggressor components of layout pattern 622 with regard to the first type width variation. The nearest layout patterns 636 and 638 of layout pattern 624 are the aggressor components of layout pattern 624 with regard to the first type width variation. Layout patterns 612" and 614" having the first mask assignment are the aggressor components of layout pattern 622 with regard to the second type width variation attributable to mask A (i.e., index j=1). Layout pattern 614" is the aggressor components of layout pattern 624 with regard to the second type width variation attributable to mask A. Also, layout pattern 622 is the aggressor components of layout pattern 624 with regard to the second type width variation attributable to mask B (i.e., index j=2), and layout pattern 624 is the aggressor components of layout pattern 622 with regard to the second type width variation attributable to mask B. The second modified layout 600D is generated by modifying the second set of layout patterns 622 and 624 according to the first modified layout 600C, three first type bias tables of the second set of width bias tables, and two second type bias tables of the second set of width bias tables.

Figure 6E:
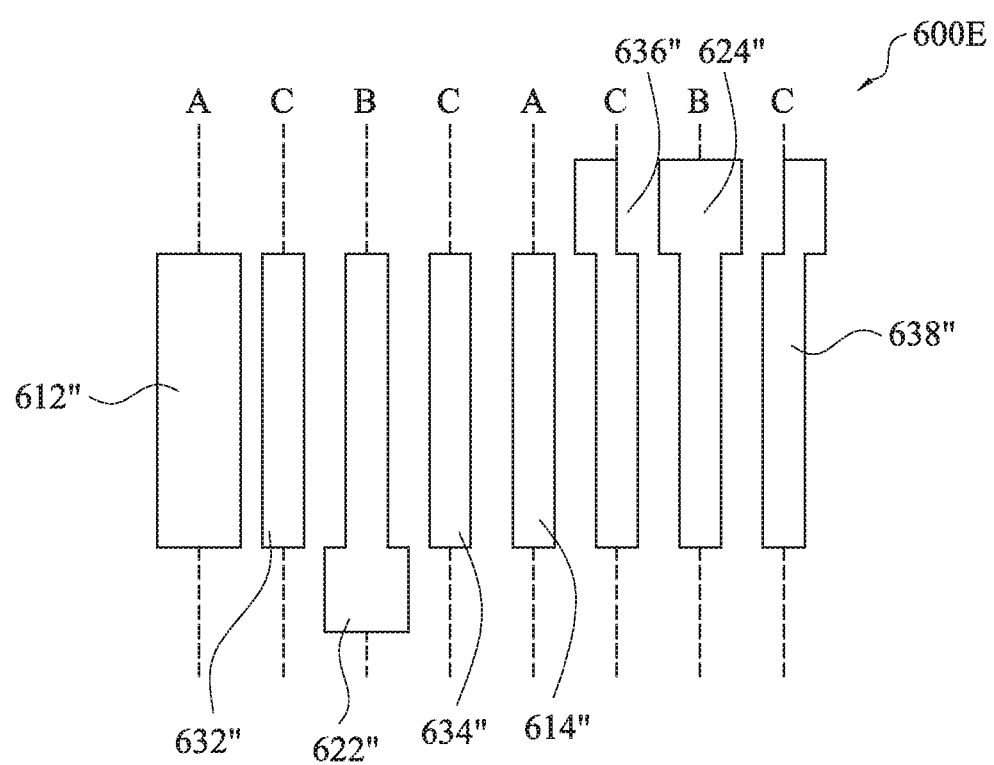
FIG. 6E is a top view of a portion of a final modified layout corresponding to LAYOUT[3] in FIG. 3 in accordance with some embodiments.

FIG. 6E is a top view of a portion of a final modified layout 600E corresponding to LAYOUT[3] in FIG. 3 in accordance with some embodiments. The third (index i=3) set of layout patterns 632, 634, and 636 are processed to become modified second set of layout patterns 632", 634", and 636". The nearest layout patterns 612" and 622" of layout pattern 632 are the aggressor components of layout pattern 632 with regard to the first type width variation. The nearest layout patterns 622" and 614" of layout pattern 634 are the aggressor components of layout pattern 634 with regard to the first type width variation. The nearest layout patterns 614" and 624" of layout pattern 636 are the aggressor components of layout pattern 636 with regard to the first type width variation. The nearest layout pattern 624" of layout pattern 638 is the aggressor components of layout pattern 638 with regard to the first type width variation.

Layout patterns 612" and 614" are the aggressor components of layout patterns 632 and 634 with regard to the second type width variation attributable to mask A (i.e., index j=1). Layout pattern 614" is the aggressor component of layout patterns 636 and 638 with regard to the second type width variation attributable to mask A. Layout pattern 622" is the aggressor component of layout patterns 632 with regard to the second type width variation attributable to mask B (i.e., index j=2). Layout patterns 622" and 624" are the aggressor components of layout patterns 634 and 636 with regard to the second type width variation attributable to mask B. Layout pattern 624" is the aggressor component of layout patterns 638 with regard to the second type width variation attributable to mask B. Also, layout pattern 634 is the aggressor component of layout pattern 632 with regard to the second type width variation attributable to mask C (i.e., index j=3). Layout patterns 632 and 636 are the aggressor components of layout pattern 634 with regard to the second type width variation attributable to mask C. Layout patterns 634 and 638 are the aggressor components of layout pattern 636 with regard to the second type width variation attributable to mask C. Layout pattern 636 is the aggressor component of layout pattern 638 with regard to the second type width variation attributable to mask C.

The third modified layout 600E is generated by modifying the third set of layout patterns 632, 634, and 636 according to the second modified layout 600D, three first type bias tables of the third set of width bias tables, and three second type bias tables of the third set of width bias tables. In some embodiments, the third modified layout 600E is used as the final modified layout in a subsequent resistance-capacitance extraction process.

Figure 7:
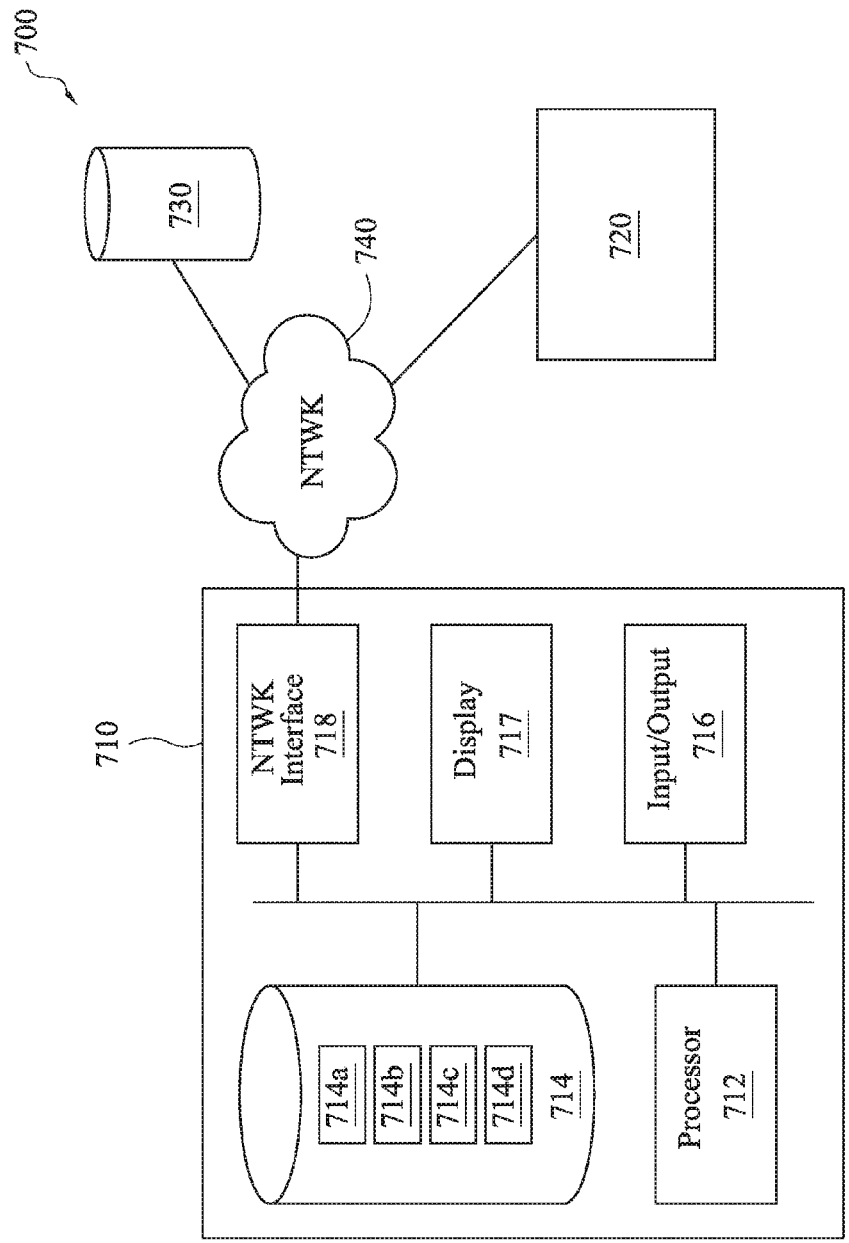
FIG. 7 is a block diagram of a resistance-capacitance extraction system usable to perform a method as illustrated in conjunction with FIGS. 3-5 in accordance with some embodiments.

FIG. 7 is a block diagram of a resistance-capacitance extraction system 700 in accordance with some embodiments. Resistance-capacitance extraction system 700 includes a first computer system 710, a second computer system 720, a networked storage device 730, and a network 740 connecting the first computer system 710, the second computer system 720, and the networked storage device 730. In some embodiments, one or more of the second computer system 720, the storage device 730, and the network 740 are omitted.

The first computer system 710 includes a hardware processor 712 communicatively coupled with a non-transitory, computer readable storage medium 714 encoded with, i.e., storing, a set of instructions 714a, an original layout file 714b, a final modified layout file 714c, or any intermediate data 714d (e.g., the intermediate modified layout 600C, 600D, or 600E) for executing the set of instructions 714a. The processing unit 712 is electrically and communicatively coupled with the computer readable storage medium 714. The processing unit 712 is configured to execute the set of instructions 714a encoded in the computer readable storage medium 714 in order to cause the computer 710 to be usable as a resistance-capacitance extraction tool for performing a method as described in conjunction with FIGS. 3-5.

In some embodiments, the set of instructions 714a, the original layout file 714b, the final modified layout file 714c, or the intermediate data 714d are stored in a non-transitory storage medium other than storage medium 714. In some embodiments, some or all of the set of instructions 714a, the original layout file 714b, the final modified layout file 714c, or the intermediate data 714d are stored in a non-transitory storage medium in networked storage device 730 or second computer system 720. In such case, some or all of the set of instructions 714a, the original layout file 714b, the final modified layout file 714c, or the intermediate data 714d stored outside computer 710 is accessible by the processing unit 712 through the network 740.

In some embodiments, the processor 712 is a central processing unit (CPU), a multi-processor, a distributed processing system, an application specific integrated circuit (ASIC), and/or a suitable processing unit.

In some embodiments, the computer readable storage medium 714 is an electronic, magnetic, optical, electromagnetic, infrared, and/or a semiconductor system (or apparatus or device). For example, the computer readable storage medium 714 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 714 includes a compact disk-read only memory (CD-ROM), a compact disk-read/write (CD-R/W), and/or a digital video disc (DVD).

The computer system 710 includes, in at least some embodiments, an input/output interface 716 and a display unit 717. The input/output interface 716 is coupled to the processor 712 and allows the circuit designer to manipulate the first computer system 710. In at least some embodiments, the display unit 717 displays the status of executing the set of instructions 714a and, in at least some embodiments, provides a Graphical User Interface (GUI). In at least some embodiments, the display unit 717 displays the status of executing the set of instructions 714a in a real time manner. In at least some embodiments, the input/output interface 716 and the display 717 allow an operator to operate the computer system 710 in an interactive manner.

In at least some embodiments, the computer system 700 also includes a network interface 718 coupled to the processor 712. The network interface 718 allows the computer system 710 to communicate with the network 740, to which one or more other computer systems are connected. The network interface includes wireless network interfaces such as BLUETOOTH, WIFI, WIMAX, GPRS, or WCDMA; or wired network interface such as ETHERNET, USB, or IEEE-1394.

In accordance with one embodiment, there is provided a method of generating a modified layout based on an original layout. Such a method includes: determining a first set of width bias values of an i-th set of layout patterns which compensate for subtractive process effects, the original layout having N sets of layout patterns corresponding to N masks, the i-th set of layout patterns having an i-th mask assignment corresponding to an i-th mask of the N masks, an order index i being an integer from 1 to N, and N being an integer greater than 1; determining a second set of width bias values of the i-th set of layout patterns of the original layout which compensate for additive process effects; generating the modified layout based on the first and second sets of width bias values of the i-th set of layout patterns, the order index i of the i-th mask corresponding to an order of the i-th mask being applied during a fabrication process; and fabricating, based on the modified layout, at least one of a semiconductor mask or at least one component in a layer of an inchoate semiconductor integrated circuit.

In accordance with another embodiment, there is provided a resistance-capacitance extraction system includes a non-transitory storage medium encoded with a set of instructions; and a hardware processor communicatively coupled with the non-transitory storage medium. The hardware processor is configured to execute the set of instructions and thereby to: determine a first set of width bias values of an i-th set of layout patterns which compensate for subtractive process effects and which is based on a set of first type width bias tables which include information regarding a first type width variation, the original layout having N sets of layout patterns corresponding to N masks, the i-th set of layout patterns having an i-th mask assignment corresponding to an i-th mask of the N masks, the order index i being an integer from 1 to N, and N being an integer greater than 1; determine a second set of width bias values the i-th set of layout patterns of the original layout which compensate for additive process effects; generate the modified layout based on the first and second sets of width bias values of the i-th set of layout patterns; perform a parasitic resistance-capacitance extraction (PRCE) process based on the modified layout resulting in a PRCE-processed modified layout; and control a semiconductor fabrication process to fabricate, based on the PRCE-processed modified layout, at least one of a semiconductor mask or at least one component in a layer of an inchoate semiconductor integrated circuit.

In accordance with another embodiment, there is provided a non-transitory storage medium encoded with a set of instructions, and the set of instructions is configured to cause a hardware processor to perform a method. Such a method includes: determining a first set of width bias values of the i-th set of layout patterns which compensate for subtractive process effects, the original layout having N sets of layout patterns corresponding to N masks, the i-th set of layout patterns having an i-th mask assignment corresponding to an i-th mask of the N masks, the order index i being an integer from 1 to N, and N being an integer greater than 1; determining a second set of width bias values the i-th set of layout patterns of the original layout which compensate for additive process effects; generating the modified layout based on the first and second sets of width bias values of the i-th set of layout patterns, the index i of the i-th mask corresponding to an order of the i-th mask being applied during a fabrication process; performing a parasitic resistance-capacitance extraction (PRCE) process on the modified layout; and controlling a semiconductor fabrication process to fabricate, based on the PRCE-modified layout, at least one of a semiconductor mask or at least one component in a layer of an inchoate semiconductor integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a modified layout based on an original layout, the method comprising:
    determining a first set of width bias values of an i-th set of layout patterns which compensate for subtractive process effects, the original layout having N sets of layout patterns corresponding to N masks, the i-th set of layout patterns having an i-th mask assignment corresponding to an i-th mask of the N masks, an order index i being an integer from 1 to N, and N being an integer greater than 1;
    determining a second set of width bias values of the i-th set of layout patterns of the original layout which compensate for additive process effects;
    generating the modified layout based on the first and second sets of width bias values of the i-th set of layout patterns,
        the order index i of the i-th mask corresponding to an order of the i-th mask being applied during a fabrication process,
        wherein one or more of the determining a first set, determining a second set, or generating is performed by a hardware processor; and
    fabricating, based on the modified layout, at least one of a semiconductor mask or at least one component in a layer of an inchoate semiconductor integrated circuit.

2. The method of claim 1, wherein
the determining the first set of width bias values includes determining a first subset of width bias values and a second subset of width bias values of the first set of width bias values based on a set of first type width bias tables, the first subset of width bias values corresponding to a first side of a selected layout pattern of the i-th set of layout patterns, the second subset of width bias values corresponding to a second side of the selected layout pattern of the i-th set of layout patterns, the second side opposing the first side, and the set of first type width bias tables including information regarding the first type width variation;

the determining the first subset of width bias values includes:
    identifying a first set of nearest layout patterns to the first side of the selected layout pattern from the first (i−1) sets of modified layout patterns, or the original layout if the order index i is 1, and the last (N−i+1) sets of layout patterns;
    determining the first subset of width bias values applicable to the first side of the selected layout pattern based on the first set of nearest layout patterns and the set of first type width bias tables; and
the determining the second subset of width bias values includes:
    identifying a second set of nearest layout patterns to the second side of the selected layout pattern from the first (i−1) modified layout patterns, or the original layout if the order index i is 1, and the last (N−i+1) sets of layout patterns; and
    determining the second subset of width bias values applicable to the second side of the selected layout pattern based on the second set of nearest layout patterns and the set of first type width bias tables.

3. The method of claim 2, wherein
the determining the first set of width bias values further includes determining a third subset of width bias values of the first set of width bias values based on the set of first type width bias tables, the third subset of width bias values corresponding to a third side of the selected layout pattern of the i-th set of layout patterns; and
the determining the third subset of width bias values includes:
    identifying a third set of nearest layout patterns to the third side of the selected layout pattern from the first (i−1) modified layout patterns, or the original layout if the order index i is 1, the last (N−i+1) sets of layout patterns; and
    determining the third subset of width bias values applicable to the third side of the selected layout pattern based on the third set of nearest layout patterns and the set of first type width bias tables.

4. The method of claim 2, wherein
the determining the second set of width bias values includes determining a third subset of width bias values and a fourth subset of width bias values of the second set of width bias values based on a set of second type width bias tables, the third subset of width bias values corresponding to the first side of the selected layout pattern, the fourth subset of width bias values corresponding to the second side of the selected layout pattern, and the set of second type width bias tables including information regarding the second type width variation;
the determining the third subset of width bias values includes:
    identifying a third set of nearest layout patterns to the first side of the selected layout pattern from each of the first (i−1) sets of modified layout patterns if the order index i is greater than 1 and the i-th set of layout patterns;
    determining the third subset of width bias values applicable to the first side of the selected layout pattern based on the third set of nearest layout patterns and the set of second type width bias tables; and
the determining the third subset of width bias values includes:
    identifying a fourth set of nearest layout patterns to the second side of the selected layout pattern from each of the first (i−1) sets of modified layout patterns if the order index i is greater than 1, and the i-th set of layout patterns; and determining the fourth subset of width bias values applicable to the second side of the selected layout pattern based on the fourth set of nearest layout patterns and the set of second type width bias tables.

5. The method of claim 4, wherein
the determining the second set of width bias values further includes determining a fifth subset of width bias values of the second set of width bias values based on the set of second type width bias tables, the fifth subset of width bias values corresponding to a third side of the selected layout pattern of the i-th set of layout patterns; and the determining the fifth subset of width bias values includes:
identifying a fifth set of layout patterns nearest to the third side of the selected layout pattern from each of the first (i−1) sets of modified layout patterns if the order index i is greater than 1, and the i-th set of layout patterns; and
determining the fifth subset of width bias values applicable to the third side of the selected layout pattern based on the fifth set of nearest layout patterns and the set of second type width bias tables.

6. The method of claim 4, wherein the generating the modified layout includes:
adjusting the first side of the selected layout pattern according to the first and third subsets of width bias values; and
adjusting the second side of the selected layout pattern according to the second and fourth subsets of width bias values.

7. The method of claim 1, wherein the N sets of layout patterns of the original layout are routed in parallel along a first direction.

8. The method of claim 1, wherein:
the layer of the inchoate semiconductor integrated circuit is an interconnection layer; and
the N sets of layout patterns of the original layout correspond to fabrication of the interconnection layer of the inchoate semiconductor integrated circuit.

9. The method of claim 1, wherein
N is 3; and
the determining the first set of width bias values and the determining the second set of width bias values for the i-th set of layout patterns of the original layout is repetitively performed consistent with a sequence of operations including:
generating a first layout by modifying the first set of layout patterns according to the original layout, three first type bias tables of a first set of width bias tables, and one second type bias table of the first set of width bias tables;
generating a second layout by modifying the second set of layout patterns in the first layout according to the first layout, three first type bias tables of a second set of width bias tables, and two second type bias tables of the second set of width bias tables; and
generating a third layout by modifying the third set of layout patterns in the second layout according to the second layout, three first type bias tables of a third set of width bias tables, and three second type bias tables of the third set of width bias tables; and
wherein the generating the modified layout includes:
using the third layout as the modified layout.

10. The method of claim 1, wherein
the subtractive process effects include effects resulting from a localized etching or a planarization process; and
the additive process effects include effects resulting from a lithographic process or a spacer process of a multiple patterning process.

11. The method of claim 1, wherein:
the fabricating includes:
performing a parasitic resistance-capacitance extraction (PRCE) process on the modified layout; and
wherein the fabricating is based on the PRCE-modified layout.

12. A resistance-capacitance extraction system, comprising:
a non-transitory storage medium encoded with a set of instructions; and
a hardware processor communicatively coupled with the non-transitory storage medium and configured to execute the set of instructions and thereby to:
determine a first set of width bias values of an i-th set of layout patterns which compensate for subtractive process effects and which is based on a set of first type width bias tables which include information regarding a first type width variation, the original layout having N sets of layout patterns corresponding to N masks, the i-th set of layout patterns having an i-th mask assignment corresponding to an i-th mask of the N masks, the order index i being an integer from 1 to N, and N being an integer greater than 1;
determine a second set of width bias values the i-th set of layout patterns of the original layout which compensate for additive process effects;
generate the modified layout based on the first and second sets of width bias values of the i-th set of layout patterns;
perform a parasitic resistance-capacitance extraction (PRCE) process based on the modified layout resulting in a PRCE-processed modified layout; and
control a semiconductor fabrication process to fabricate, based on the PRCE-processed modified layout, at least one of a semiconductor mask or at least one component in a layer of an inchoate semiconductor integrated circuit.

13. The resistance-capacitance extraction system of claim 12, wherein
the original layout and the modified layout are accessible in a Graphic Database System (GDS) file format.

14. The resistance-capacitance extraction system of claim 12, wherein
the hardware processor, when executing the set of instructions to perform the determining the first set of width bias values, is further configured to determine a first subset of width bias values and a second subset of width bias values of the first set of width bias values based on the set of first type width bias tables, the first subset of width bias values corresponding to a first side of a selected layout pattern of the i-th set of layout patterns, the second subset of width bias values corresponding to a second side of the selected layout pattern of the i-th set of layout patterns, the second side opposing the first side;
the determining the first subset of width bias values includes:
identifying a first set of nearest layout patterns to the first side of the selected layout pattern from the first (i−1) sets of modified layout patterns, or the original layout if the order index i is 1, and the last (N−i+1) sets of layout patterns; and determining the first subset of width bias values applicable to the first side of the selected layout pattern based on the first set of nearest layout patterns and the set of first type width bias tables; and the determining the second subset of width bias values includes:

identifying a second set of nearest layout patterns to the second side of the selected layout pattern from the first (i−1) modified layout patterns, or the original layout if the order index i is 1, and the last (N−i+1) sets of layout patterns; and determining the second subset of width bias values applicable to the second side of the selected layout pattern based on the second set of nearest layout patterns and the set of first type width bias tables.

15. The resistance-capacitance extraction system of claim 14, wherein the hardware processor, when executing the set of instructions to perform the determining the second set of width bias values, is further configured to determine a third subset of width bias values and a fourth subset of width bias values of the second set of width bias values based on a set of second type width bias tables, the third subset of width bias values corresponding to the first side of the selected layout pattern, the fourth subset of width bias values corresponding to the second side of the selected layout pattern, and the set of second type width bias tables including information regarding the second type width variation;

the determining the third subset of width bias values includes:

identifying a third set of nearest layout patterns to the first side of the selected layout pattern from each of the first (i−1) sets of modified layout patterns if the order index i is greater than 1 and the i-th set of layout patterns; and determining the third subset of width bias values applicable to the first side of the selected layout pattern based on the third set of nearest layout patterns and the set of second type width bias tables; and the determining the fourth subset of width bias values includes:

identifying a fourth set of nearest layout patterns to the second side of the selected layout pattern from each of the first (i−1) sets of modified layout patterns if the order index i is greater than 1, and the i-th set of layout patterns; and determining the fourth subset of width bias values applicable to the second side of the selected layout pattern based on the fourth set of nearest layout patterns and the set of second type width bias tables.

16. The resistance-capacitance extraction system of claim 12, wherein

N equals three; and the hardware processor, when executing the set of instructions, is further configured to repetitively perform the determining the first set of width bias values and the determining the second set of width bias values consistent with a sequence of operations including:

generating a first layout by modifying the first set of layout patterns according to the original layout, three first type bias tables of a first set of width bias tables, and one second type bias tables of the first set of width bias tables;

generating a second layout by modifying the second set of layout patterns in the first layout according to the first layout, three first type bias tables of a second set of width bias tables, and two second type bias tables of the second set of width bias tables; and generating the modified layout by modifying the third set of layout patterns in the second layout according to the second layout, three first type bias tables of a third set of width bias tables, and three second type bias tables of the third set of width bias tables.

17. A non-transitory storage medium encoded with a set of instructions, the set of instructions is configured to cause a hardware processor to perform a method comprising:

determining a first set of width bias values of the i-th set of layout patterns which compensate for subtractive process effects, the original layout having N sets of layout patterns corresponding to N masks, the i-th set of layout patterns having an i-th mask assignment corresponding to an i-th mask of the N masks, the order index i being an integer from 1 to N, and N being an integer greater than 1;

determining a second set of width bias values the i-th set of layout patterns of the original layout which compensate for additive process effects;

generating the modified layout based on the first and second sets of width bias values of the i-th set of layout patterns, the index i of the i-th mask corresponding to an order of the i-th mask being applied during a fabrication process;

performing a parasitic resistance-capacitance extraction (PRCE) process on the modified layout; and controlling a semiconductor fabrication process to fabricate, based on the PRCE-modified layout, at least one of a semiconductor mask or at least one component in a layer of an inchoate semiconductor integrated circuit.

18. The non-transitory storage medium of claim 17, wherein:

the set of instructions is configured to cause the hardware processor to perform the determining the first set of width bias values based on a set of first type width bias tables including information regarding a first type width variation, the determining the first set of width bias values including:

identifying a first set of nearest layout patterns to a selected layout pattern of the i-th set of layout patterns from the first (i−1) sets of modified layout patterns, or the original layout if the order index i is 1, and the last (N−i+1) sets of layout patterns; and determining the first set of width bias values applicable to the selected layout pattern based on the first set of nearest layout patterns and the set of first type width bias tables.

19. The non-transitory storage medium of claim 18, wherein:

the set of instructions is configured to cause the hardware processor to perform the determining the second set of width bias values based on a set of second type width bias tables including information regarding a second type width variation, the determining the second set of width bias values including:

identifying a second set of nearest layout patterns to the selected layout pattern from each of the first (i−1) sets of modified layout patterns if the order index i is greater than 1 and the i-th set of layout patterns; and determining the second set of width bias values applicable to the selected layout pattern based on second set of nearest layout patterns and the set of second type width bias tables.

20. The non-transitory storage medium of claim 17, wherein

N equals three; and the set of instructions is configured to cause the hardware processor to repetitively perform the determining the first set of width bias values and the determining the second set of width bias values consistent with a sequence of operations including:

generating a first layout by modifying the first set of layout patterns according to the original layout, three first type bias tables of the first set of width bias tables, and one second type bias tables of the first set of width bias tables;

generating a second layout by modifying the second set of layout patterns in the first layout according to the first layout, three first type bias tables of the second set of width bias tables, and two second type bias tables of the second set of width bias tables; and generating the modified layout by modifying the third set of layout patterns in the second layout according to the second layout, three first type bias tables of the third set of width bias tables, and three second type bias tables of the third set of width bias tables.

\* \* \* \* \*